United States Patent [19]

Thomas et al.

[11] Patent Number: 4,700,961

[45] Date of Patent: Oct. 20, 1987

[54] PROTECTED AUTOMOTIVE BATTERY ACCESS TERMINALS

[75] Inventors: Harold F. Thomas, 8480 Hyne Rd., Brighton, Mich. 48116; James M. Deimen, Pinckney, Mich.

[73] Assignee: Harold F. Thomas, Brighton, Mich.

[21] Appl. No.: 843,310

[22] Filed: Mar. 24, 1986

[51] Int. Cl.$^4$ ............................................. H02G 3/00
[52] U.S. Cl. ............................... 280/152 A; 180/68.5; 307/10 R; 439/34; 439/133; 439/142
[58] Field of Search ........................... 280/152 A, 422; 180/68.5, 65.1, 69.24, 89.17; 320/25, 26; 339/29 B, 44 R, 10, 34, 36; 307/10

[56] References Cited

U.S. PATENT DOCUMENTS

| | | | |
|---|---|---|---|
| 3,189,862 | 6/1965 | Vleerick et al. | 339/34 |
| 3,466,453 | 9/1969 | Greenberg | 320/25 |
| 3,583,513 | 6/1971 | Macadam | 180/69.24 |
| 3,622,684 | 11/1971 | Press | 339/34 |
| 3,942,027 | 3/1976 | Fima | 180/68.5 |
| 4,079,304 | 3/1978 | Brandenburg | 320/25 |
| 4,185,204 | 1/1980 | Fima | 307/10 R |

FOREIGN PATENT DOCUMENTS 456528  11/1936  United Kingdom ................. 339/34

*Primary Examiner*—John J. Love
*Assistant Examiner*—Eric D. Culbreth
*Attorney, Agent, or Firm*—James M. Deimen

[57] ABSTRACT

A pair of electrical terminals conveniently accessible from the exterior of an automobile or truck and connected electrically to the positive and negative poles of a battery within the engine compartment of the vehicle. The terminals are located within a recessed chamber formed in the vehicle body with an insulated separator located between the terminals and supporting the terminals. To protect against tampering and environmental conditions a cover door with a locking latch encloses the recessed chamber. Preferably the door chamber, terminals and electrical connections to the battery poles are of sufficient size to permit the use of heavy gauge jumper cables for quick charging of the battery and quick starting of the vehicle. By locating the terminals in a chamber external to the engine compartment or other battery compartment of the vehicle the likelihood of a battery explosion caused by an inadvertent spark in connecting or disconnecting the jumper cables is greatly lessened, if not entirely eliminated.

6 Claims, 8 Drawing Figures

PROTECTED AUTOMOTIVE BATTERY ACCESS TERMINALS

BACKGROUND OF THE INVENTION

The field of the invention pertains to automotive electrical equipment and in particular to means to recharge the storage battery of an automobile or truck in a safe and convenient manner.

Although batteries, and in particular rechargeable storage batteries, have been included in automobiles and trucks since the advent of the electric starter, recharge of the storage battery in the event of discharge or exceptionally cold weather continues to require access to the battery poles under the hood of the vehicle, under a seat, or in a more inconvenient location.

The typical lead-acid storage battery generates hydrogen gas as it is recharged. A not infrequent occurrence is the explosion of a lead-acid battery caused by the ignition of hydrgoen gas with an electric spark in attaching or detaching recharging cables. Such explosions have caused numerous severe injuries.

Nevertheless, means to avoid such injuries are not incorporated in current vehicles beyond mere warning tags on lead acid storage batteries and in instruction booklets. With a view toward providing a more convenient and much safer means to attach recharge cables to the storage battery of a vehicle, applicant has invented the device disclosed below.

SUMMARY OF THE INVENTION

The invention comprises a pair of electrical terminals conveniently accessible from the exterior of an automobile or truck and connected electrically to the positive and negative poles of a battery within the engine compartment of the vehicle. The terminals are located within a recessed chamber formed in the vehicle body, with an insulated separator located between the terminals and insulated means supporting the terminals. Preferably the recessed chamber and separator is formed of a single plastic unit with the terminals extending therein on either side of the separator.

To protect against tampering and environmental conditions, a cover door with a locking latch encloses the recessed chamber. Preferably the door, chamber, terminals and electrical connections to the battery poles are of sufficient size to permit the use of heavy gauge jumper cables for quick charging of the battery and quick starting of the vehicle. By locating the terminals in a chamber external to the engine compartment or other battery compartment of the vehicle, the likelihood of a battery explosio caused by an inadvertant spark in connecting or disconnecting the jumper cables is greatly lessened, if not entirely eliminated.

Preferably the recessed chamber is molded as an integral part of a plastic fender or other body part of the vehicle. A plastic recessed chamber attached to a steel fender or other body part can be formed to prevent inadvertent contact of the jumper cables with the steel by providing a plastic shoulder about the recess as an integral part of the plastic chamber.

In an alternate embodiment the door is hinged to open downwardly about a horizontal axis and the pair of terminals are spaced from either side of an insulative separator mounted on and at the center of the back of the door. The terminals are also mounted to a panel attached to the back of the door such that the entire door assembly brings the terminals outwardly for convenient access when the door is fully opened. With the door fully closed, the terminals are enclosed within the vehicle body.

DESCRIPTION OF THE PREFERRED EMBODIMENT

Figure 1:
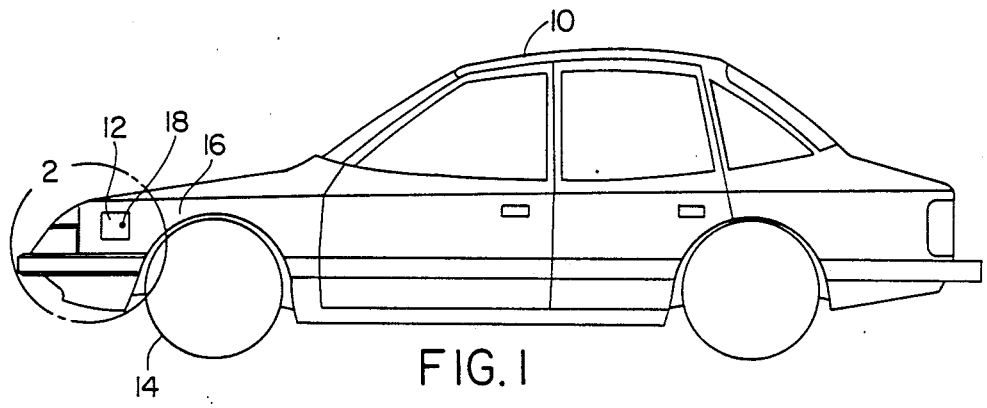
FIG. 1 is a side view of a vehicle illustrating a convenient location for the access terminals and chamber.

Illustrated in FIG. 1 is an automobile 10 of conventional design with the exception of an access door 12 located ahead of the left front wheel 14 and in the fender 16. The door 12 includes a key lock and latch 18 and, as shown closed, appears similar to a fuel filler pipe access door but for the location on the vehicle and the construction of the recessed terminal chamber behind the door.

Figure 2:
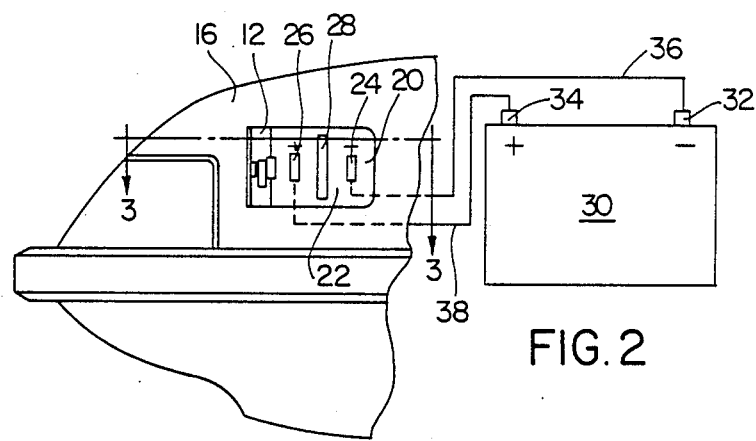
FIG. 2 is a partial cutaway view of the vehicle left front fender.
Figure 3:
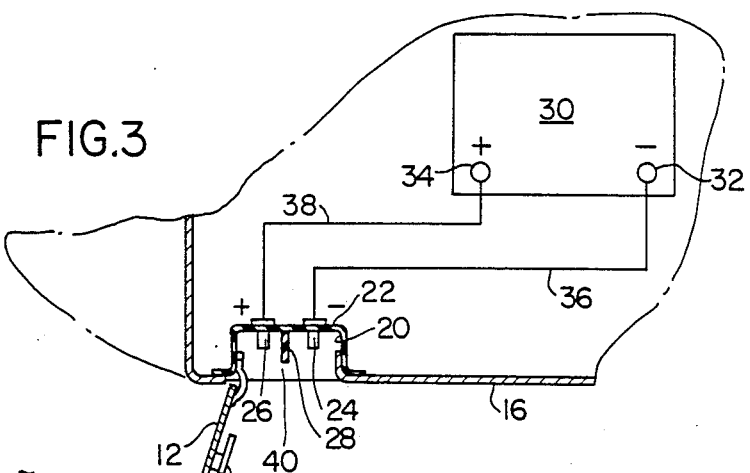
FIG. 3 is a partial cutaway view of the vehicle left front fender taken along the line 3—3 in FIG. 2.

In FIGS. 2 and 3 the access door 12 is shown open to expose the recessed chamber 20 therebehind. The back wall 22 of the chamber includes a pair of terminals 24 and 26 inserted through holes in the back wall and affixed to the back wall. Extending from the back wall 22 and between the terminals 24 and 26 is a separator 28.

Preferably the recessed chamber 20 is formed by an insulative plastic such as polypropylene or polyvinyl chloride commonly used for automotive components. Likewise the separator 28 is also formed of such plastic and preferably made integrally with the recessed chamber 20. The chamber and separator may also be made integrally with a plastic fender or as a separate structure affixed to the fender as illustrated in the figures.

The negative and positive terminals 24 and 26 respectively are electrically connected to the respective poles 32 and 34 on the battery 30 as illustrated by the respective conduits 36 and 38. The conduits 36 and 38 are preferably of heavy gauge wire substantially equal in gauge to the cables connecting the battery 30 to the solenoid and starter motor (not shown). The terminals 24 and 26 also should be of a size adequate to accept the heavy alligator clamps of typical jumper cables. The separator 28 extends outwardly between the terminals a distance sufficient to prevent inadvertent contact of the alligator clamps as they are attached or detached.

Figure 3A:
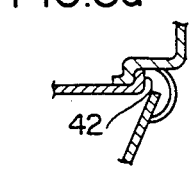
FIGS. 3a and 3b detail a preferable construction for the chamber opening.
Figure 3B:
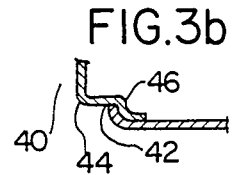

The fender 16 as shown in FIG. 3 is formed with an aperture 40 surrounded by an inwardly folded edge or bead as shown at 42. The recessed chamber 20 is preferably formed with a peripheral edge having a double shoulder 44 and 46 as detailed in FIGS. 3a and 3b. The shoulder 46 is formed to mate with folded bead 42 of the fender 16. Adhesive or mechanical means may be used to affix the shoulder 46 and folded bead 42 together for a permanent structure extra. The shoulder 44 provides a means to protect against inadvertent contact of an alligator clamp with a metal fender 16. Although the shoulder 44 is not necessary to protect against electrical contact with a plastic fender 16, the shoulder 44 protects against inadvertent damage to the external appearance of the fender about the recessed chamber 20.

Figure 6:
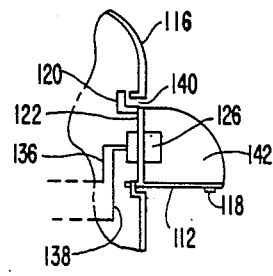
FIG. 6 is a partial cutaway front view of the alternate embodiment taken along the line 6—6 in FIG. 4.
Figure 4:
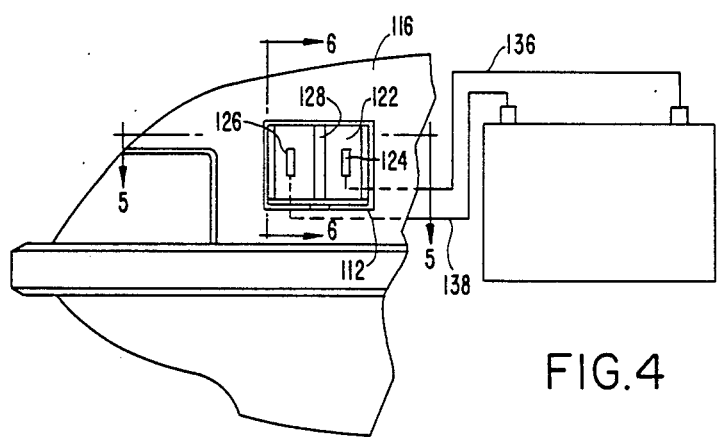
FIG. 4 is a partial cutaway view of the vehicle left front fender showing an alternate embodiment of the access terminals and chamber.
Figure 5:
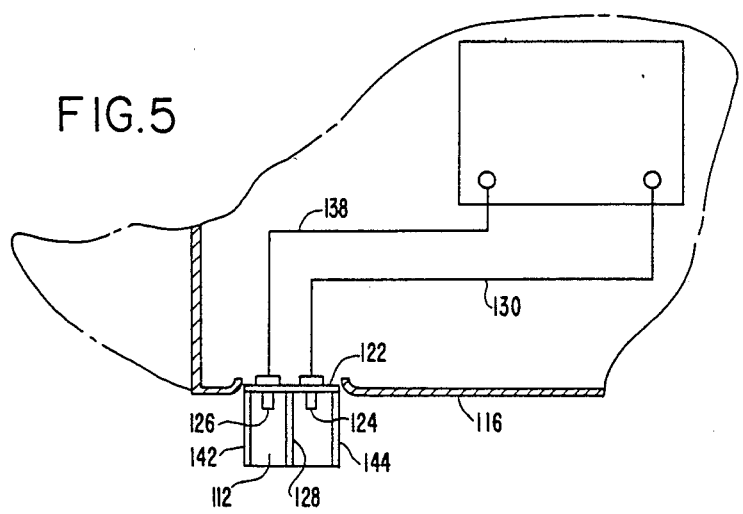
FIG. 5 is a partial cutaway top view of the alternate embodiment taken along the line 5—5 in FIG. 4.

In the alternate embodiment illustrated in FIGS. 4, 5 and 6, the door 112 is hinged or mounted to swing about a horizontal axis adjacent the bottom of the door and opening 140 in the fender 116. Formed with or attached to the inside center of the door 112 is a 90° sector shaped panel 128 perpendicular to the door. The 90° sector shaped or quadrant panel 128, preferably of an insulative material, is located between the negative and positive terminals 124 and 126 which in turn are mounted in a back panel 122 also of an insulative material. The back panel 122 is also formed with or attached to the door 112 adjacent the door bottom. The terminals 124 and 126 are attached by conduits 136 and 138 to a storage battery as above but are sufficiently long and flexible to permit the door 112 and attached terminals 124 and 126 to open and close the opening 140 in the fender 116.

A small tab 120 extends from the back panel 122 and engages the inside of the upper edge of the opening 140 in the fender 116. The door 112 thus opens about the horizontal axis until the door is approximately horizontal. Thus, the back panel 122 is substantially vertical and substantially fills the opening 140. The terminals thus extend outwardly from the plane of the fender opening and are easily accessible.

With the door 112 rotated closed, the back panel 122 is horizontal within the fender cavity and the terminals extend upwardly within the fender. The door 112 may also be equipped with a lock 118. To provide extra protection for the terminals additional optional 90° sector shaped or quadrant side panels 142 and 146 may be attached to or formed with the inside of the door 112 adjacent the left and right edges of the door. The quadrant panels extend to the back panel 122, thus forming pockets for the terminals 124 and 126. Attachment of the quadrant panels 142 and 144 to the back panel 122 strengthens the back panel also.

Preferably the door, back panel, and quadrant panels are all molded of a one piece plastic unit. The lock, hinge and terminals, of metal, can then be mechanically fastened to the plastic unit in any suitable manner.

We claim:

1. In an automotive vehicle including a storage battery therein and an external vehicle body enclosing at least a portion of the vehicle including the storage battery, the improvement comprising an aperture in the body and a rotatable door in closed position covering the aperture, insulative attachment means extending from the back of the door, a pair of electrically conductive male terminals each of a size sufficient to accept automotive jumper cable alligator clips and each extending from the insulative attachment means, an insulative separator panel extending from the back of the door between the male terminals and substantially parallel thereto and a pair of flexible electrical conduits connecting the pair of terminals to the poles of the storage battery in parallel whereby rotation of the door to open the aperture brings the male terminals into the aperture opening.

2. The automotive vehicle improvement of claim 1 wherein the separator panel is perpendicular to the door back and the insulative attachment means is a panel perpendicular to both the separator panel and the door back.

3. The automotive vehicle improvement of claim 1 including a pair of side panels, each located on the opposite side of a terminal from the separator panel.

4. The automotive vehicle improvement of claim 3 wherein each side panel and the separator panel are spaced from the respective male terminals a distance sufficient for the attachment of automotive jumper cable alligator clips.

5. The automotive vehicle improvement of claim 1 including means to limit the door swing to bring the male terminals through the aperture and the insulative attachment means into the aperture opening.

6. The automotive vehicle improvement of claim 5 including a pair of side panels, each located on the opposite side of a male terminal from the separator panel and positioned to extend through the aperture between a terminal and the vehicle body upon opening of the door.

* * * * *